United States Patent [19]

Varshney et al.

[11] Patent Number: 5,629,393

[45] Date of Patent: May 13, 1997

[54] INITIATING PROCESS AND SYSTEM FOR THE ANIONIC POLYMERIZATION OF ACRYLIC MONOMERS

[75] Inventors: Sunil K. Varshney, Liege; Roger Fayt, Neupre; Philippe Teyssie, Neuville En Condroz, all of Belgium

[73] Assignee: Elf Atochem S.A., Paris la Defense, France

[21] Appl. No.: 91,403

[22] Filed: Jul. 14, 1993

Related U.S. Application Data

[63] Continuation of Ser. No. 776,231, filed as PCT/FR90/00388 Jun. 5, 1990, abandoned.

[30] Foreign Application Priority Data

Jun. 5, 1989 [FR] France .................................. 89 07374
May 22, 1990 [FR] France .................................. 90 06351

[51] Int. Cl.$^6$ .......................... C08F 4/56; C08F 226/06; C08F 220/10; C08F 212/06; C08F 210/00; C08F 293/00; B01T 31/00
[52] U.S. Cl. ...................... 526/175; 526/265; 526/328.5; 526/347; 526/348.6; 525/299; 502/157
[58] Field of Search ...................... 526/175, 265, 526/328.5, 347, 348.6; 525/299; 502/157

[56] References Cited

U.S. PATENT DOCUMENTS

| | | | |
|---|---|---|---|
| 3,189,663 | 6/1965 | Nozaki | 525/299 |
| 3,285,894 | 11/1966 | Lim et al. | 526/175 |
| 4,767,824 | 8/1988 | Ouhadi et al. | 525/343 |
| 5,057,583 | 10/1991 | Tung et al. | 526/175 |
| 5,391,628 | 2/1995 | Gaillard et al. | 525/250 |

FOREIGN PATENT DOCUMENTS

| | | |
|---|---|---|
| 1003543 | 9/1965 | United Kingdom. |
| 1477373 | 6/1977 | United Kingdom. |

OTHER PUBLICATIONS

Wiles, D.M. et al., "The butyllithium–initiated polymerization of methyl–methyacrylate. III. Effects of lithium alkoxides," Journal of Physical Chemistry, vol. 68, No. 7, Jul. 1964, pp. 1983–1987.

D. M. Wiles and S. Bywater, Trans. Faraday Soc. 61,150, 1965.

*Primary Examiner*—Joseph L. Schofer
*Assistant Examiner*—Wu C. Cheng
*Attorney, Agent, or Firm*—Finnegan, Henderson, Farabow, Garrett and Dunner, L.L.P.

[57] ABSTRACT

The initiating system for the anionic polymerization of acrylic monomers, and where necessary, vinyl comonomers, including at least one R-M initiator in which M=a metal chosen from among the alkaline and alcaline earth metals and R=an alkyl with a linear or branched chain at $C_2$–$C_6$ or aryl or arylalkyl, is characterized by the fact that the polymerization takes place in the presence also of at least one $R_1OM_1$ alkaline metal alcoholate, in which R=an alkyl with a linear or branched chain at $C_1$–$C_6$ or aryl or arylalkyl and $M_1$=an alkaline metal, on condition that when $M_1$ is lithium, then R=an aryl or arylalkyl. Said process for the polymerization of primary, secondary, or tertiary alkyl acrylates, and possibly of vinyl comonomers, is characterized by the fact that the polymerization takes place in the presence of an initiating system as described above.

35 Claims, No Drawings

INITIATING PROCESS AND SYSTEM FOR THE ANIONIC POLYMERIZATION OF ACRYLIC MONOMERS

This application is a continuation of application Ser. No. 07/776,231,filed as PCT/FR90/00388 Jun. 5, 1990, now abandoned.

The present invention relates to a process and to an initiating system for the anionic polymerisation of acrylic monomers and, if appropriate, of vinyl comonomers. More particularly, it relates to the polymerisation of primary alkyl acrylates and the preparation of diblock copolymers combining a primary alkyl acrylate block with a block of methacrylic monomer, of secondary or tertiary alkyl acrylate or of vinyl monomer.

The anionic polymerisation of methyl methacrylate in the presence of a mixture of butyllithium and lithium alcoholates is known from the Journal of Physical Chemistry 68(7), pages 1983–87. Unfortunately, this system of initiators exhibits unfavourable kinetics, the yield not exceeding 30% after 21 minutes and 65% after 70 minutes. Furthermore, British Patent No. 1,003,549 describes a process for anionic polymerisation of ethylenically unsaturated monomers employing tertiary alcoholates of alkali metals as catalysts.

These alcoholates can be employed in combination with organometallic compounds, in particular alkyllithiums, with which they form complexes. By virtue of such catalysts the polymerisation of methyl methacrylate runs uniformly in a temperature range from −40° to +20° C., after a short induction period whose length is inversely proportional to the quantity of catalyst which is added. Up to +10° C. an isotactic polymethyl methacrylate (PMMA) is formed (as confirmed by infrared analysis and by nuclear magnetic resonance), whereas above 10° C. an insoluble three-dimensional polymer is produced. The polymerisation of butyl acrylate at 0° C. in the presence of potassium tert-butanolate produces a viscous prepolymer syrup.

Lastly, Patent FR-A-2,252,360 describes a mixture of ethyl ester of alpha-lithioisobutyric acid and of an alkali metal alcoholate which reaches only a 41% yield in the polymerisation of n-butyl acrylate.

Furthermore, Example 17 of European Patent Application No. 068,887 describes the sequential addition of ethyl acrylate and then of methyl methacrylate, in equivalent quantities, to tetrahydrofuran in the presence of a catalyst consisting of tetrabutylammonium fluoride and [(1-methoxy-2-methyl-1-propenyl)oxy]trimethylsilane. The exothermic polymerisation takes place at a temperature which is not lower than 25° C. and results in a viscous liquid copolymer, of number-average molecular weight of 600, with a polydispersity index of 2.0 and consisting of 45 mol % of methacrylate units and 55 mol % of acrylate units.

The problem, so far unsolved, with which the present invention is concerned consists, therefore, in defining an initiating system and a process permitting, with satisfactory yields, the direct anionic polymerisation of primary alkyl acrylates and, with kinetics which are more favourable than those of the known systems based on an alkali metal alcoholate, the anionic polymerisation of other acrylic, methacrylic or vinyl monomers, so as to permit the preparation of solid diblock copolymers of high molecular weight, combining a primary alkyl acrylate block with a block of such a comonomer.

The present invention is based on the finding that it is possible to reach high yields in the anionic polymerisation of (meth)acrylates by carrying out the said polymerisation in the presence of carefully selected pairs of an initiator of formula R-M in which M denotes an alkali metal and R an alkyl, aryl or alkylaryl radical and of at least one alkali metal alcoholate. In fact, the polymerisation yield of a monomer such as methyl methacrylate or n-butyl acrylate generally reaches at least 70% in the presence of such an initiating pair.

Thus, a first subject of the present invention consists of an initiating system for the anionic polymerisation of (meth)acrylates and, if appropriate, of vinyl comonomers, comprising at least one initiator of formula R-M(I) in which M denotes a metal chosen from alkali and alkaline-earth metals and R denotes a straight- or branched-chain alkyl radical containing from 2 to 6 carbon atoms or an aryl radical or an arylalkyl radical, characterised in that it additionally comprises at least one alkali metal alcoholate of formula $R_1OM_1$ in which $R_1$ denotes a straight- or branched-chain alkyl radical containing from 1 to 6 carbon atoms or an aryl radical or an arylalkyl radical, and $M_1$ denotes an alkali metal, with the condition that, when $M_1$ is lithium, then R denotes an aryl or arylalkyl radical. In the polymerisation initiating system according to the invention, $M_1$ is preferably chosen from sodium, potassium, rubidium and caesium. When $M_1$ is lithium, the initiator of formula (I) may be chosen especially from the compounds of formula:

$$(C_6H_5)_2CHM$$

in which M is chosen from lithium, sodium and potassium, and from 1,1-diphenyl-3-methylpentyllithium, 1,1-diphenylhexyllithium and alpha-methylstyryllithium. When $M_1$ is not lithium, then compounds such as n-butyllithium, 1,4-disodio-1,1,4,4-tetraphenylbutane, n-butylsodium or sec-butyllithium can be added to this list. The molar ratio of the alkali metal alcoholate to the initiator in the initiating system according to the invention may vary within very wide limits. However, the obtaining of specific results in the polymerisation of (meth)acrylates is generally determined by the choice of a molar ratio of between approximately 0.3 and approximately 25, although larger quantities of alcoholate cannot be detrimental. In order to solve the problems addressed by the present invention, the quantity of alcoholate must be sufficient to permit the formation of a complex with the polymerisation active centre and, thereby, to stabilise the latter.

A second subject of the present invention consists of a process for the polymerisation of (meth)acrylates and optionally of vinyl comonomers with the aid of at least one initiator of formula R-M(I) in which M denotes a metal chosen from alkali and alkaline-earth metals and R denotes a straight- or branched-chain alkyl radical containing 2 to 6 carbon atoms or an aryl radical or an arylalkyl radical, characterised in that the polymerisation is carried out in the additional presence of at least one alkali metal alcoholate of formula $R_1OM_1$ in which $R_1$ denotes a straight- or branched-chain alkyl radical containing from 1 to 6 carbon atoms or an aryl radical or an arylalkyl radical, and $M_1$ denotes an alkali metal, with the condition that, when $M_1$ is lithium, then R denotes an aryl or arylalkyl radical.

The initiator of formula (I) and the alkali metal alcoholate form together a polymerisation initiating system in accordance with the first subject of the present invention and in the case of which reference will be made to the detailed description above.

Initiators of formula R-M(I) which can be employed in the process according to the invention are especially diphenylmethylsodium, diphenylmethylpotassium and 1,4-disodio-1,1,4,4-tetraphenylbutane, alpha-methylstyryllithium and diphenylmethyllithium.

The process according to the invention is particularly advantageous for obtaining polymers containing a primary alkyl acrylate block, the said acrylate being chosen especially from those in which the alkyl group, substituted, if appropriate, by at least one halogen atom such as chlorine or fluorine, contains from 1 to 8 carbon atoms, more particularly methyl acrylate, ethyl acrylate, n-propyl acrylate, n-butyl acrylate, n-hexyl acrylate, 2,2,2-trifluoroethyl acrylate or 2-ethylhexyl acrylate. In this case, it permits the preparation of blocks which have a number-average molecular weight of approximately between 2,000 and 200,000 and a molecular mass dispersity index (defined as the ratio of the weight-average molecular mass to the number-average molecular mass) which is generally approximately between 1.2 and 3.5, as determined by exclusion chromatography.

The process according to the invention can also be employed for the polymerisation of secondary or tertiary alkyl acrylates such as the isopropyl, sec-butyl or tert-butyl compounds, of methacrylic monomers and, also, of nonacrylic vinyl comonomers. Nonacrylic vinyl comonomers which may be mentioned are especially butadiene, isoprene, 2-vinylpyridine, 4-vinylpyridine and vinylaromatic monomers.

A methacrylic monomer within the meaning of the present invention means a monomer chosen from alkyl methacrylates in which the alkyl radical, substituted if appropriate, for example by at least one halogen atom such as chlorine or fluorine, contains 1 to 18 carbon atoms, such as methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl and decyl methacrylates, as well as glycidyl methacrylate, norbornyl methacrylate, methacrylonitrile and dialkylmethacrylamides.

A vinylaromatic monomer within the meaning of the present invention means an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

In particular, the process according to the invention permits the preparation of a diblock copolymer of structure A-B in which A denotes a block of methacrylic monomer, of secondary or tertiary alkyl acrylate or of vinylaromatic monomer, and B denotes a primary alkyl acrylate block, the number-average molecular weight of the block A being approximately between 2,000 and 300,000, the number-average molecular weight of the block B being approximately between 2,000 and 200,000, and the polydispersity index of the diblock copolymer being approximately between 1.2 and 2.2. It is then characterised in that:

(1) in a first stage, the anionic polymerisation of a monomer A is conducted with the aid of an initiating system comprising at least one initiator of formula R-M(I) in which M denotes a metal chosen from alkali and alkaline-earth metals and R denotes a straight- or branched-chain alkyl radical containing from 2 to 6 carbon atoms or an aryl radical or an arylalkyl radical and at least one alkali metal alcoholate of formula $R_1OM_1$ in which $R_1$ denotes a straight- or branched-chain alkyl radical containing from 1 to 6 carbon atoms or an aryl radical or an arylalkyl radical, and $M_1$ denotes an alkali metal, with the condition that, when $M_1$ is lithium, then R denotes an aryl or arylalkyl radical, so as to obtain a living chain unit of the polymer block A, and then (2) in a second stage the living chain unit thus obtained is reacted with a monomer B in the presence of the initiating system of the first stage.

The proportion of alkali metal alcoholate employed in the process according to the invention depends on the initiator which is chosen, but also on the monomer(s) to be polymerised. Thus, in the case of the polymerisation of a monomer such as methyl methacrylate or a primary alkyl acrylate, a molar proportion of alcoholate of approximately between 0.3 and 15 to the initiator is generally satisfactory. In the case of the preparation of diblock copolymers as described above, an alcoholate/initiator molar ratio of approximately between 2 and 25 is preferably chosen, although larger quantities of alcoholate cannot be detrimental.

The polymerisation or copolymerisation in the process according to the invention is preferably carried out in the absence of moisture and oxygen and in the presence of at least one solvent chosen preferably from aromatic solvents such as benzene and toluene, or else tetrahydrofuran, diglyme, tetraglyme, ortho-terphenyl, biphenyl, decalin or, again, tetralin.

The polymerisation temperature may vary approximately between −80° C. and +60° C., especially in the case of methyl methacrylate, and preferably approximately between −80° C. and +10° C. in the case of most of the other monomers and especially in the case of the block polymerisations. Finally, the initiator is generally employed in a molar ratio to the sum of the monomers A and B which does not exceed approximately $10^{-2}$ and is preferably between $3 \times 10^{-4}$ and $10^{-2}$.

The process according to the invention also makes it possible to prepare polyalkyl methacrylates, as defined above, which have a number-average molecular mass which is generally approximately between 7,000 and 150,000 and with a molecular mass polydispersity index, defined and determined as above, which is generally approximately between 1.05 and 2.0. These polymethacrylates are not crosslinked and generally contain up to 60% of isotactic triads, from 5 to 50% of heterotactic triads and from 25 to 60% of syndiotactic triads.

The following examples are given by way of illustration and do not limit the present invention.

In all these examples the exclusion chromatography was performed by using a Waters GPC 501 apparatus equipped with two linear columns, with tetrahydrofuran as eluent at a flow rate of 1 ml/min. The number-average molecular masses were determined by means of an HP 502 membrane osmometer.

EXAMPLE 1

$0.72 \times 10^{-3}$ mol of sodium tert-butylate, previously purified by freeze-drying in benzene and then stored under inert atmosphere in the absence of light, is introduced under nitrogen atmosphere into a predried round bottom flask. 100 ml of predried toluene are added to it, followed, with stirring, dropwise, by $0.2 \times 10^{-3}$ mol of 1,4-disodio-1,1,4,4-tetraphenylbutane in 0.2 molar solution in toluene. The mixture is cooled to a temperature of −78° C. by means of a mixture of acetone and solid carbon dioxide and then 10 ml of a solution containing 0.04 mol of n-butyl acrylate in toluene are added, still at −78° C., the said acrylate having been previously stirred for 48 hours over calcium hydride, distilled and then treated with fluorenyllithium until the appearance of a permanent yellow colour, and finally distilled over triethylaluminium immediately before the polymerisation.

Reaction is stopped after 60 minutes by adding 5 ml of methanol, after which the solvent is stripped off. n-Butyl polyacrylate is obtained in an 89% yield. Analysis of the polymer by exclusion chromatography shows the following characteristics:

$M_n$ (number-average molecular mass): 32,000

$M_w/M_n$ (polydispersity index): 2.6

EXAMPLE 2

The experiment of Example 1 is reproduced, 1,4-disosio-1,1,4,4-tetraphenylbutane being replaced with $0.2 \times 10^{-3}$ mol of diphenylmethylpotassium and using $10^{-2}$ mol of sodium tert-butylate. After 60 minutes' reaction, poly-n-butyl acrylate is obtained in a 91% yield. Analysis of the polymer by exclusion chromatography shows the following characteristics:

$M_n=44,000$ $M_w/M_n=2.4$

EXAMPLE 3

The experiment of Example 2 is reproduced, using $0.2 \times 10^{-3}$ mol of diphenylmethylpotassium and $0.7 \times 10^{-3}$ mol of sodium tert-butylate and adding in succession 0.03 mol of tert-butyl methacrylate and then 0.10 mol of n-butyl acrylate. After 240 minutes reaction a block copolymer is obtained in a 75% yield. Analysis of the polymer by exclusion chromatography shows the following characteristics:

Poly(n-BuMA) block: $M_n=24,000$ $M_w/M_n=1.4$

Poly(t-BuA) block: $M_n=24,000$ $M_w/Mn=3.1$

EXAMPLE 4

The experimental procedure of Example 1 is reproduced, the conditions and the ingredients being adjusted as follows:

alcoholate: $9.4 \times 10^{-3}$ mol of sodium tert-butylate
initiator: $0.94 \times 10^{-3}$ mol of diphenylmethylsodium
monomer: 4.7 g of methyl methacrylate
solvent: 100 ml of toluene
polymerisation temperature: +23° C.
polymerisation time: 5 minutes.

Under these conditions a polymethyl methacrylate which has the following characteristics is obtained in 100% yield:

$M_n=13,500$ $M_w/M_n=1.18$

EXAMPLE 5

The experiment of Example 4 is reproduced, sodium tert-butylate being replaced with lithium tertbutylate and diphenylmethylsodium with diphenylmethyllithium. A polymethyl methacrylate which has the following characteristics is obtained in a 94% yield:

$M_n=11,000$ $M_w/M_n=1.6$

EXAMPLE 6

The experimental procedure of Example 1 is reproduced, the conditions and the ingredients being adjusted as follows:

alcoholate: $0.5 \times 10^{-3}$ mol of sodium tert-butylate
initiator: $10^{-3}$ mol of diphenylmethylsodium
monomer: 4.7 g of methyl methacrylate
solvent: 100 ml of toluene
polymerisation temperature: −30° C.
polymerisation time: 10 minutes.

Under these conditions a polymethyl methacrylate which has the following characteristics is obtained in 100% yield:

$M_n=7,000$ $M_w/M_n=1.39$

Its microstructure can be described as follows:

syndiotactic triads: 13.6%
heterotactic triads: 35.7%
isotactic triads: 50.7%

EXAMPLE 7

The experiment of Example 6 is reproduced, with the exception of the quantity of alcoholate which is raised to $10^{-2}$ mol. A polymethyl methacrylate which has the following characteristics is obtained in 100% yield:

$M_n=9,500$ $M_w/M_n=1.05$

Its microstructure can be described as follows:

syndiotactic triads: 44.6%
heterotactic triads: 38.7%
isotactic triads: 16.7%

EXAMPLE 8

The experimental procedure of Example 1 is reproduced, the conditions and the ingredients being adjusted as follows:

alcoholate: $2 \times 10^{-3}$ mol of sodium tert-butylate
initiator: $0.2 \times 10^{-3}$ mol of diphenylmethylsodium
monomer: 5 g of methyl methacrylate
solvent: 100 ml of tetrahydrofuran
polymerisation temperature: −50° C.
polymerisation time: 5 minutes.

Under these conditions a polymethyl methacrylate which has the following characteristics is obtained in 100% yield:

$M_n=26,500$ $M_w/M_n=1.4$

Its microstructure can be described as follows:

syndiotactic triads: 54.3%
heterotactic triads: 41.3%
isotactic triads: 4.2%

EXAMPLE 9

The experimental procedure of Example 1 is reproduced, the conditions and the ingredients being adjusted as follows:

alcoholate: $2.2 \times 10^{-3}$ mol of lithium tert-butylate
initiator: $0.2 \times 10^{-3}$ mol of diphenylmethyllithium
monomer: 3.8 g of methyl methacrylate
solvent: 100 ml of toluene
polymerisation temperature: −30° C.
polymerisation time: 10 minutes.

Under these conditions a polymethyl methacrylate which has the following characteristics is obtained in 100% yield:

$M_n=89,000$ $M_w/M_n=1.35$

EXAMPLE 10

The experimental procedure of Example 1 is reproduced, the conditions and the ingredients being adjusted as follows:

alcoholate: $2.5 \times 10^{-3}$ mol of lithium tert-butylate initiator: 0.25×10⁻³ mol of alpha-methylstyryllithium monomers: 5 g of styrene, then 5 g of methyl methacrylate solvent: mixture of 70 ml of toluene and 30 ml of tetrahydrofuran polymerisation temperature: −40° C.

polymerisation time: 60 minutes for styrene then 30 minutes for methyl methacrylate.

Under these conditions a block copolymer is obtained in a 72% yield, in which the polystyrene block has the following characteristics:

$M_n=26{,}000\ M_w/M_n=1.10$ and in which the polymethyl methacrylate block has the following characteristics:

$M_n=30{,}000\ M_w/M_n=1.10$

EXAMPLE 11

The experimental procedure of Example 4 is reproduced, except for the polymerisation temperature, which is raised to +45° C. A polymethyl methacrylate which has the following characteristics is obtained in 100% yield:

$M_n=13{,}500\ M_w/M_n=2.0$

EXAMPLE 12

The experimental procedure of Example 1 is reproduced, the conditions and ingredients being adjusted as follows:

initiator: 0.86×10⁻³ mol of n-butylsodium alcoholate: 8.6×10⁻³ mol of sodium tert-butylate monomer: 5 ml of n-butyl acrylate solvent: 100 ml of toluene polymerisation time: 30 minutes polymerisation temperature: −78° C.

Under these conditions a poly-n-butyl acrylate which has the following characteristics is obtained in a 71% yield:

$M_n=29{,}000\ M_w/M_n=2.8$

EXAMPLE 13

The experimental procedure of Example 12 is reproduced, with the following exceptions:

initiator: 0.4×10⁻³ mol of diphenylmethylsodium alcoholate: 4×10⁻³ of sodium tert-butylate solvent: mixture of 12 ml of tetrahydrofuran and 28 ml of toluene.

Under these conditions a poly-n-butyl acrylate which has the following characteristics is obtained in an 85% yield:

$M_n=37{,}500\ M_w/M_n=2.5$

EXAMPLE 14

The experimental procedure of Example 12 is reproduced, with the following exceptions:

initiator: 1.25×10⁻³ mol of diphenylhexylsodium alcoholate: 12.5×10⁻³ mol of sodium tert-butylate solvent: mixture of 5 ml of tetrahydrofuran and 100 ml of toluene Under these conditions a poly-n-butyl acrylate which has the following characteristics is obtained in a 71% yield:

$M_n=82{,}000\ M_w/M_n=2.7$

EXAMPLE 15

5 g of styrene are polymerised first at 0° C. for 1 hour in a mixture of 90 ml of toluene and 10 ml of tetrahydrofuran in the presence of a system comprising 10⁻³ mol of n-butylsodium and 10⁻² mol of sodium tert-butylate. Analysis of the polymer block obtained at this stage shows the formation of polystyrene which has the following characteristics:

$M_n=20{,}300\ M_w/M_n=1.1$

The mixture is then cooled to a temperature of −78° C. before 1.4×10⁻³ mol of diphenylethylene is added to it, followed by 8 g of n-butyl acrylate diluted in 10 ml of toluene. After the polymerisation has been continued for 2 hours at −78° C., a diblock copolymer which has the following characteristics is obtained in a 73% yield:

$M_n=28{,}500\ M_w/M_n=1.3$

EXAMPLE 16

The experimental procedure of Example 1 is reproduced, the conditions and the ingredients being adjusted as follows:

alcoholate: 5×10⁻³ mol of potassium tert-butylate initiator: 10⁻³ mol of diphenylmethylpotassium monomer: 0.04 mol of n-butyl acrylate solvent: 50 ml of tetrahydrofuran polymerisation temperature: −78° C.

polymerisation time: 10 minutes.

Under these conditions a poly-n-butyl acrylate which has the following characteristics is obtained in a 95% yield:

$M_n=4{,}500\ M_w/M_n=1.8$

EXAMPLE 17

The experiment of Example 6 is reproduced, with the following exceptions:

initiator: 2×10⁻³ mol of diphenylmethyllithium alcoholate: 20.8×10⁻³ mol of lithium tert-butylate monomer: 4 g of methyl methacrylate solvent: 100 ml of toluene Under these conditions a polymethyl methacrylate which has the following characteristics and microstructure is obtained in 100% yield:

$M_n=7{,}800\ M_w/M_n=1.3$ syndiotactic triads: 32.1% heterotactic triads: 10.2% isotactic triads: 57.7%

EXAMPLE 18

5 g of styrene are first polymerised at 0° C. for 30 minutes in a mixture of 90 ml of toluene and 10 ml of tetrahydrofuran in the presence of a system comprising 10⁻³ mol of n-butylsodium and 10⁻² mol of sodium tert-butylate. Analysis of the polymer block obtained at this stage shows the formation of polystyrene which has the following characteristics:

$M_n=23{,}500\ M_w/M_n=1.07$ 1.05×10⁻³ mol of diphenylethylene is then added to the reaction mixture, followed by 5 g of methyl methacrylate.

After the polymerisation has been continued at 0° C. for 15 minutes, a diblock copolymer which has the following characteristics is obtained in 100% yield:

$M_n$=50,600 $M_w/M_n$=1.18

EXAMPLES 19 to 30

The alkali metal M tert-butanolate, previously purified by freeze-drying in benzene and then stored under inert atmosphere in the absence of light, is introduced under nitrogen atmosphere into a predried round bottom flask. 100 ml of a solvent or mixture of solvents (200 ml in the case of Examples 25 and 26) containing x% of tetrahydrofuran and (100–x)% of toluene, the solvent(s) being predried, are added to it, followed, dropwise with stirring, by the initiator in 0.2 molar solution in tetrahydrofuran. The molar quantities of tert-butanolate and of initiator, and the nature of the alkali metal $M_1$ and of the initiator and the value x are shown in Table I below. The mixture is brought to the temperature T (expressed in degrees Celsius) and methyl methacrylate, previously stirred for 48 hours over calcium hydride, distilled and then treated with triethylaluminium immediately before the polymerisation, is then added at this temperature.

After 30 minutes' reaction the solution is sampled in order to analyse the first polymer block obtained by exclusion chromatography. 2-Ethylhexyl acrylate, previously stirred for 48 hours over calcium hydride, distilled and then treated with fluorenyllithium until the appearance of a yellow colour and finally distilled over triethylaluminium immediately before the polymerisation, is then added to the reactor. The 2-ethylhexyl acrylate is then polymerised for one hour, still at the temperature T. The reaction is stopped by adding 2 ml of acidified methanol, after which the product is precipitated in an excess of methanol. After drying in a vacuum at 80° C. the diblock copolymer is obtained in the yield Y (expressed as a percentage) shown in Table I. The value of T and the molar quantities of methyl methacrylate (MMA) and 2-ethylhexyl acrylate (EHA) are also shown in Table 1, together with the number-average molecular mass ($M_n$) expressed in thousands and the polydispersity ($M_w/M_n$) of the block obtained at the end of the first stage and of the overall diblock polymer. Table I therefore illustrates the variety of the diblock polymers which can be obtained by varying reaction parameters such as $M_1$, X, T and the molar quantities of the various ingredients.

TABLE I

| | | tert-Butanolate | Initiator | | | |
|---|---|---|---|---|---|---|
| Example | $M_1$ | mol | nature | mol | X | T |
| 19 | Na | 3 × 10⁻³ | φ₂CHNa | 5 × 10⁻⁴ | 0 | –78 |
| 20 | Na | 3 × 10⁻³ | φ₂CHNa | 5 × 10⁻⁴ | 100 | –78 |
| 21 | K | 3 × 10⁻³ | φ₂CHK | 5 × 10⁻⁴ | 0 | –78 |
| 22 | K | 3 × 10⁻³ | φ₂CHK | 5 × 10⁻⁴ | 0 | –30 |
| 23 | Li | 3.2 × 10⁻³ | DPHLi | 5 × 10⁻⁴ | 0 | –78 |
| 24 | Li | 3.2 × 10⁻³ | DPHLi | 5 × 10⁻⁴ | 0 | –30 |
| 25 | Li | 3.5 × 10⁻³ | DPHLi | 3.5 × 10⁻⁴ | 0 | –78 |
| 26 | Li | 8 × 10⁻³ | DPHLi | 5 × 10⁻⁴ | 0 | –78 |
| 27 | Li | 8 × 10⁻³ | DPHLi | 5 × 10⁻⁴ | 50 | –78 |
| 28 | Li | 3.2 × 10⁻³ | DPHLi | 5 × 10⁻⁴ | 100 | –78 |
| 29 | Li | 3.2 × 10⁻³ | DPHLi | 5 × 10⁻⁴ | 100 | –30 |
| 30 | Li | 6.4 × 10⁻³ | DPHLi | 2.5 × 10⁻⁴ | 100 | –78 |

| | | | | 1st block | | diblock | |
|---|---|---|---|---|---|---|---|
| Example | MMA (mol) | EHA (mol) | Y | $M_n$ | $M_w/M_n$ | $M_n$ | $M_w/M_n$ |
| 19 | 4.5 × 10⁻² | 2.4 × 10⁻² | 100 | nd | nd | 36 | 2.0 |
| 20 | 4.5 × 10⁻² | 2.4 × 10⁻² | 60 | 8.5 | 1.2 | 12 | 1.3 |
| 21 | 4.5 × 10⁻² | 2.4 × 10⁻² | 100 | 20 | 1.4 | 32 | 2.1 |
| 22 | 4.5 × 10⁻² | 2.4 × 10⁻² | 89 | 16 | 1.7 | 21 | 2.1 |
| 23 | 4.5 × 10⁻² | 2.4 × 10⁻² | 98 | 19 | 1.2 | 29 | 1.5 |
| 24 | 4.5 × 10⁻² | 2.5 × 10⁻² | 81 | 15 | 1.3 | 19 | 1.4 |
| 25 | 4.5 × 10⁻² | 7.3 × 10⁻² | 100 | 26 | 1.2 | 65 | 1.6 |
| 26 | 4.5 × 10⁻² | 7.3 × 10⁻² | 98 | 15 | 1.4 | 40 | 1.7 |
| 27 | 4.5 × 10⁻² | 2.4 × 10⁻² | 93 | 16 | 1.3 | 28 | 1.3 |
| 28 | 4.5 × 10⁻² | 2.4 × 10⁻² | 83 | 13 | 1.1 | 50(*) | 1.15(*) |
| 29 | 4.5 × 10⁻² | 2.4 × 10⁻² | 54 | 12 | 1.5 | 16 | 1.5 |
| 30 | 4.5 × 10⁻² | 2.5 × 10⁻² | 76 | 30 | 1.2 | 40 | 1.3 |

φ₂CHNa: Diphenylmethylsodium
φ₂CHK: Diphenylmethylpotassium
DPHLi: Diphenylhexyllithium
nd: not determined
(*) after fractionation of the product obtained at the end of the second stage, the chromatography of this product revealing a bimodal distribution: the product contains 65% by weight of diblock copolymer and 35% of methyl methacrylate homopolymer.

We claim:

1. An initiating system for the anionic polymerization of (meth)acrylic monomers or the anionic copolymerization of (meth)acrylic monomers and vinyl comonomers, comprising at least one initiator of the formula $(C_6H_5)_2CHM$ in which M is chosen from lithium, sodium and potassium; and at least one alkali metal alcoholate of the formula $R_1OLi$, in which $R_1$ is a straight- or branched-chain alkyl radical containing from 1 to 6 carbon atoms, an aryl radical or an arylalkyl radical.

2. Initiating system for the anionic polymerization of acrylic monomers or the anionic copolymerization of acrylic monomers and vinyl comonomers, comprising at least one initiator selected from the group consisting of 1,1-diphenyl-3-methylpentyllithium, 1,1-diphenyl-hexyllithium and alpha-methylstyryllithium; and at least one alkali metal alcoholate of the formula $R_1OLi$, in which $R_1$ is a straight- or branched-chain alkyl radical containing from 1 to 6 carbon atoms, an aryl radical or an arylalkyl radical.

3. Diblock copolymer comprising a structure A-B in which A is a block of a methacrylic monomer, a secondary or tertiary alkyl acrylate or a vinylaromatic monomer, and B denotes a primary alkyl acrylate block, wherein the number-average molecular weight of the block A is between 2,000 and 300,000, the number-average molecular weight of the block B is between 2,000 and 200,000, and the polydispersity index of the diblock copolymer is between 1.2 and 2.2.

4. An initiating system for the anionic polymerization of (meth)acrylic monomers or the anionic copolymerization of (meth)acrylic monomers and vinyl comonomers, comprising at least one initiator of the formula R-M (I) in which M is an alkali metal or an alkaline-earth metal; and R is an aryl radical or an alkylaryl radical; and at least one alcoholate of the formula $R_1OM_1$ in which $R_1$ is a straight- or branched-chain alkyl radical containing from 1 to 6 carbon atoms, an aryl radical or an arylalkyl radical; and $M_1$ is sodium, potassium, rubidium or caesium.

5. A process for the preparation of a diblock copolymer of the structure A-B in which A is a block of a methacrylic monomer, a secondary or tertiary alkyl acrylate or a vinylaromatic monomer, and B denotes a primary alkyl acrylate block, wherein the number-average molecular weight of the block A is between 2,000 and 300,000, the number-average molecular weight of the block B is between 2,000 and 200,000, and the polydispersity index of the diblock copolymer is between 1.2 and 2.2, wherein in a first stage, the anionic polymerization of monomer A is conducted with the aid of an initiating system comprising at least one initiator of the formula R-M (I) in which M is an alkali metal or an alkaline-earth metal; and R is a straight- or branched-chain alkyl radical containing 2 to 6 carbon atoms, an aryl radical, or an arylalkyl radical, and at least one alcoholate of the formula $R_1OM_1$ in which $R_1$ is a straight- or branched-chain alkyl radical containing from 1 to 6 carbon atoms, an aryl radical or an arylalkyl radical; and $M_1$ is sodium, potassium, rubidium or caesium, excluding the initiating systems alkyl lithium and $R_1OM_1$, when $R_1$ is an alkyl, to prepare a living chain unit of monomer A, and in a second stage the living chain unit of monomer A is reacted with monomer B in the presence of the initiating system of the first stage.

6. Initiating system according to claims 1, 2 or 4 wherein the alcoholate/initiator molar ratio is between 0.3 and 25.

7. Process for the polymerization of a primary, secondary or tertiary alkyl acrylate and/or a methacrylic monomer or for the copolymerization of a primary, secondary or tertiary alkyl acrylate and/or a methacrylic monomer and a nonacrylic vinyl comonomer selected from butadiene, isoprene, 2-vinylpyridine, 4-vinylpyridine and vinylaromatic monomers, comprising polymerization in the presence of an initiating system according to claims 1, 2 or 4.

8. Process according to claim 7, wherein the polymerization is carried out at a temperature of between −80° C. and +60° C.

9. Process according to claim 7, wherein the polymerization is carried out in the presence of at least one solvent.

10. Process according to claim 9, wherein the solvent is tetrahydrofuran.

11. Process according to claim 9, wherein the solvent is toluene.

12. Initiating system according to claim 4, wherein formula R-M (I) is 1,1-diphenyl-3-methylpentyllithium, 1-1, diphenylhexyllithium, alpha-methylstryryllithium, n-butyllithium, 1,4-disodio-1,1,4,4-tetraphenylbutane, n-butylsodium sec-butyllithium, diphenylmethylsodium, diphenylmethyllithium or diphenylmethylpotassium.

13. Diblock polymer according to claim 3, wherein said primary alkyl acrylate block B is a block of methyl acrylate, ethyl acrylate, n-propyl acrylate, n-butyl acrylate, n-hexyl acrylate, 2,2,2-trifluoroethyl acrylate or 2-ethylhexyl acrylate.

14. Diblock polymer according to claim 3 wherein said methacrylic monomer block A is a block of an alkyl methacrylate having an alkyl radical of methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, and decyl methacrylate, glycidyl methacrylate, norbornyl methacrylate, methacrylonitrile, dialkylmethacrylamide or of a halogenated monomer of these.

15. Diblock polymer according to claim 3, wherein said vinylaromatic monomer block A is a block of styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tertbutylstyrene, 2,4-dichlorostyrene, 2,6-dichlorostyrene or 1-vinylnaphthalene.

16. Process according to claim 9, wherein the solvent is benzene, toluene, tetrahydrofuran, diglyme, tetraglyme, orthoterphenyl, biphenyl, decalin or tetralin.

17. A process for the preparation of a diblock copolymer of the structure A-B according to claim 3, wherein in a first stage the anionic polymerization of monomer A is conducted with the aid of an initiating system comprising at least one initiator of the formula $(C_6H_5)_2CHM$ in which M is chosen from lithium, sodium and potassium; and at least one alkali metal alcoholate of the formula $R_1OLi$, in which $R_1$ is a straight- or branched-chain alkyl radical containing from 1 to 6 carbon atoms, an aryl radical, or an arylakyl radical, to prepare a living chain unit of monomer A, and in a second stage the living chain unit of monomer A is reacted with monomer B in the presence of the initiating system of the first stage.

18. The process according to claim 17, wherein the alcoholate/initiator molar ratio is between 2 and 25.

19. The process according to claim 17, wherein the polymerization temperature is between −80° C. and +10° C.

20. The process according to claim 17 wherein the initiator is present during polymerization in a molar ratio relative to the sum of said monomers A and B which does not exceed approximately $10^{-2}$.

21. The process according to claim 20 wherein the molar ratio is between $3 \times 10^{-4}$ to $10^{-2}$.

22. The process according to claim 5, wherein said primary alkyl acrylate block B is a block of methyl acrylate, ethyl acrylate, n-propyl acrylate, n-butyl acrylate, n-hexyl acrylate, 2,2,2-trifluoroethyl acrylate, 2-ethylhexyl acrylate.

23. The process according to claim 5 wherein said methacrylic monomer block A is a block of an alkyl methacrylate having an alkyl radical of methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, or decyl, glycidyl methacrylate, norbornyl methacrylate, methacrylonitrile, dialkylmethacrylamide or a halogenated monomer thereof.

24. The process according to claim 5, wherein said vinylaromatic monomer block A is a block of styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tertbutylstyrene, 2,4-dichlorostyrene, 2,6-dichlorostyrene or 1-vinylnaphthalene.

25. The process according to claim 9, wherein the alcoholate/initiator molar ratio is between 2 and 25.

26. The process according to claim 9 wherein the polymerization temperature is between −80° C. and +10° C.

27. The process according to claim 29 wherein the initiator is present during polymerization in a molar ratio relative to the sum of said monomers A and B which does not exceed approximately $10^{-2}$.

28. The process according to claim 27, wherein the molar ratio is between $3 \times 10^{-4}$ and $10^{-2}$.

29. A diblock copolymer according to claim 3, wherein said secondary or tertiary alkyl acrylate block A is a block of isopropyl acrylate, sec-butyl acrylate or tertbutyl acrylate.

30. A process for the preparation of a diblock copolymer of the structure A-B according to claim 3, wherein in a first stage the anionic polymerization of monomer A is conducted with the aid of an initiating system comprising at least one initiator selected from the group consisting of 1,1-diphenyl-3-methylpentyllithium, 1,1-diphenyl-hexyllithium and alpha-methylstyryllithium; and at least one alkali metal alcoholate of the formula $R_1OLi$, in which $R_1$ is a straight- or branched-chain alkyl radical containing from 1 to 6 carbon atoms, an aryl radical or an alkylaryl radical, to prepare a living chain unit of monomer A, and in a second stage the living chain unit of monomer A is reacted with monomer B in the presence of the initiating system of the first stage.

31. The process according to claim 30, wherein the alcoholate/initiator molar ratio ranges from 2 and 25.

32. The process according to claim 30, wherein the polymerization temperature ranges from $-80°$ C. and $+10°$ C.

33. The process according to claim 30, wherein the initiator is present during polymerization in a molar ratio relative to the sum of said monomers A and B which does not exceed approximately $10^{-2}$.

34. The process according to claim 5, wherein said secondary or tertiary alkyl acrylate block A is a block of isopropyl acrylate, sec-butyl acrylate or tert-butyl acrylate.

35. The initiating system according to claim 4 wherein the initiator is selected from the group consisting of $(C_6H_5)_2CHNa$, $(C_6H_5)_2CHK$, and 1,4-disodio-1,1,4,4-tetraphenyl butane, and at which includes least one alcoholate of the formula $R_1ONa$ or $R_1OK$, wherein $R_1$ is a straight or branched alkyl radical containing 1 to 6 carbon atoms.

* * * * *